US011770188B2

United States Patent
Cautereels et al.

(10) Patent No.: US 11,770,188 B2
(45) Date of Patent: Sep. 26, 2023

(54) OPTICAL NETWORK UNIT ACTIVATION

(71) Applicant: Nokia Solutions and Networks Oy, Espoo (FI)

(72) Inventors: Paul Henri Marie Cautereels, Hingene (BE); Carl Julien Godelieve Mertens, Brasschaat (BE); Michael Fivez, Lier (BE); Rene Bonk, Pforzheim (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/540,665

(22) Filed: Dec. 2, 2021

(65) Prior Publication Data

US 2022/0190914 A1 Jun. 16, 2022

(30) Foreign Application Priority Data

Dec. 16, 2020 (EP) ..................................... 20214772

(51) Int. Cl.
*H04B 10/079* (2013.01)
*H04B 10/2575* (2013.01)

(52) U.S. Cl.
CPC . *H04B 10/07953* (2013.01); *H04B 10/07955* (2013.01); *H04B 10/25752* (2013.01)

(58) Field of Classification Search
None
See application file for complete search history.

(56) References Cited

U.S. PATENT DOCUMENTS

2007/0127923 A1\* 6/2007 Dalton ............... H04Q 11/0067
  398/71
2011/0142437 A1\* 6/2011 Luo ..................... H04J 3/0608
  398/1

FOREIGN PATENT DOCUMENTS

EP 3474566 A1 4/2019
EP 3474567 A1 4/2019

OTHER PUBLICATIONS

"10-Gigabit-capable passive optical network (XG-PON) systems: Definitions, abbreviations and acronyms," International Telecommunication Union, ITU-T G.987, Telecommunication Standardization Sector of ITU, Jun. 2012, pp. 1-26.
"40-Gigabit-capable passive optical network (XG-PON2): Definitions, abbreviations and acronyms," International Telecommunication Union, ITU-T G.989, Telecommunication Standardization Sector of ITU, Oct. 2015, pp. 1-32.
"10-Gigabit-capable symmetric passive optical network (XGS-PON)," International Telecommunication Union, ITU-T G.9807, Telecommunication Standardization Sector of ITU, Oct. 2017, pp. 1-290.

(Continued)

*Primary Examiner* — Darren E Wolf
(74) *Attorney, Agent, or Firm* — Harness, Dickey & Pierce, P.L.C.

(57) ABSTRACT

The present disclosure relates to an optical line terminal, OLT, which is enabled to range optical network units, ONUs, in a point-to-multipoint optical network by detecting interference burst sequences transmitted by one or more joining ONUs during transmission of upstream data traffic from transmitting ONUs. The present disclosure further relates to an optical network unit, ONU, which is enabled to transmit, at a selected transmission time, an interference burst sequence including a sequence of pulses allowing the OLT to identify the ONU as a joining ONU.

15 Claims, 5 Drawing Sheets

(56) References Cited

OTHER PUBLICATIONS

"Gigabit-capable passive optical networks (G-PON): Transmission convergence layer specification," International Telecommunication Union, ITU-T G.984, Telecommunication Standardization Sector of ITU, Jan. 2014, pp. 1-170.
European Search Report For European Patent Application No. 20214772.4 dated Jun. 25, 2021.

* cited by examiner

OPTICAL NETWORK UNIT ACTIVATION

CROSS-REFERENCE TO RELATED APPLICATIONS

This application claims priority to and the benefit of European Patent Application No. 20214772.4 filed on Dec. 16, 2020, the entire contents of each of which are incorporated herein by reference.

TECHNICAL FIELD

The present disclosure relates to an activation of an optical network unit, ONU, in an optical network and more specifically the present disclosure relates to an ONU ranging in a point-to-multipoint optical network.

BACKGROUND

In an optical network, whether passive or active, a new optical network unit, ONU, is allocated a timeslot to transmit after a successful ranging process. The ranging process involves halting the upstream data traffic in the entire optical network for a certain period of time known as the quiet window. During the quiet window, the OLT measures the roundtrip delay, RTD, to the new ONU and then sends instructions to it so that the new ONU adjusts its transmission delay. This transmission delay adjustment guarantees that the data traffic from the new ONU will not collide with the data traffic from the already activated or transmitting ONUs. This ranging process is periodically repeated so that new ONUs may join the optical network to transmit their data traffic over the optical network.

The length of the quiet window depends on the maximum supported length of the optical fibre and, typically, has a duration of at least 200 µsec and sometimes could be at long as 500 µsec during which the already activated ONUs need to halt transmission and buffer their data traffic. This introduces significant latency into the upstream data transmission which is unacceptable for certain applications where low latency data transmission needs to be guaranteed.

SUMMARY

It is an object of embodiments of the present disclosure to provide an alternative ranging process which reduces the overall latency impact on upstream data traffic in optical networks. It is a further object of embodiments of the present disclosure to enable the support of latency-sensitive applications in optical networks.

The scope of protection sought for various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by an optical line terminal, OLT, configured to communicate in a point-to-multipoint optical network with optical network units, ONUs, where upstream traffic from one or more transmitting ONUs to the OLT is organized in frames comprising codewords, the OLT being configured to perform:

detecting, in the upstream traffic, an interference burst sequence transmitted by an ONU, the interference burst sequence comprising a pre-determined sequence of pulses for inducing errors distributed over the codewords, and, allowing the OLT to identify the ONU as a joining ONU;

allocating an upstream transmission timeslot in one or more subsequent frames for the ONU;

determining timing information for enabling a subsequent transmission from the ONU to be received within the allocated upstream transmission timeslot based on a time of reception of the interference burst sequence and the allocated upstream transmission timeslot; and transmitting the timing information to the ONU.

In other words, the interference burst sequence transmitted by the joining ONU induces errors in the upstream traffic. More particularly, the induced errors are distributed over the codewords in the upstream frame. This allows the OLT to detect and correct the errors in the upstream traffic thereby assuring error-free upstream traffic reception. Further, as the interference burst sequence comprises a pre-determined sequence of pulses, the OLT is able to distinguish these errors from other random errors and to identify these errors as a joining request from a joining ONU. The OLT then determines a time of reception of the interference burst sequence and allocates a timeslot in one or more upstream frames to the joining ONU. Based on this information, i.e. the determined time of reception and the allocated upstream transmission timeslot, the OLT determines timing information which allows the joining ONU to determine a new time of transmission which enables a subsequent transmission from the joining ONU to be received by the OLT within the allocated upstream timeslot.

By doing so, the OLT derives timing information relative to its reference time. Providing this timing information to the ONU allows the ONU to correct its transmission time accordingly with respect to its own reference time, thereby enabling its upstream transmission to be received by the OLT within the upstream transmission timeslot allocated to the joining ONU. Thus, a ranging process is effected without configuring any quiet windows. Otherwise said, the OLT does not halt the upstream transmission for all transmitting ONUs for the ranging process contrary to the conventional solutions. As a result, significant latency in the upstream traffic is avoided thereby enabling low latency data transmission.

According to an example embodiment, the detecting comprises detecting interference burst sequences transmitted by ONUs, the interference burst sequences respectively comprising a pre-determined sequence of pulses for inducing errors distributed over the codewords, and, allowing the OLT to identify the ONUs as joining ONUs; and wherein the detecting further comprises identifying a number of the detected interference burst sequences.

In other words, as the errors induced in the upstream traffic are caused by interference burst sequences comprising pre-determine pulse sequences, the OLT is able to identify the ONUs as joining ONUs. Depending on when the interference burst sequences were transmitted by the respective joining ONUs and their location in the optical network relative to the OLT, the errors induced in the upstream traffic by the transmitted interference burst sequences may or may not overlap. Thus, based on the induced errors the OLT is able to identify a number of the interference burst sequences and, therefore, a number of joining ONUs.

According to an example embodiment, the interference burst sequences are associated with pre-determined subsets of interference burst sequences, and, wherein the OLT is further configured to perform an elimination procedure for distinctively identifying one or more joining ONUs from the joining ONUs based upon the pre-determined subsets.

In other words, the interference burst sequences and therefore the predetermined pulse sequences are associated with pre-determined subsets of interference pulse sequences. The respective interference burst sequences may be associated with one or more subsets. Associating the interference burst sequences with subsets, allows the OLT to limit efficiently the number of joining requests to a number of joining requests which may be distinctively identified by the OLT. More specifically, the OLT is able to limit the number of the joining ONUs to the extend it is able to distinctively identify the errors in the upstream frame from the respective interference burst sequences.

This avoids the need of employing a unique interference burst sequence by the respective ONUs in the optical network. This allows to drastically limit the number of interference burst sequences, i.e. the minimum of one, while still allowing to limit the number of joining requests to the extent the OLT is able to distinctively identify the joining request from different joining ONUs.

According to an example embodiment, wherein the elimination procedure comprises: selecting a subset from the pre-determined subsets and requesting a new transmission of interference burst sequences to joining ONUs which transmitted interference burst sequences associated with the selected subset.

In other words, the OLT, first, selects one of the subsets to which the detected interference burst sequences are associated with. The OLT then requests a new transmission of interference burst sequences from the joining ONUs which have transmitted an interference burst sequence associated with the selected subset. Employing the concept of subsets allows limiting the number of joining requests efficiently.

According to an example embodiment, the interference burst sequences are associated with respective pre-determined subsets, and, wherein the selecting further takes into account the detected interference burst sequences.

In other words, the interference burst sequences may be associated with respective subsets, thereby avoiding associated an interference burst sequence to more than one subset. This further improves the efficiency of the elimination procedure. For example, if the OLT detects two interference burst patterns associated with a first subset and one interference burst pattern associated with a second subset, the OLT may select the second subset rather than the first subset, thus limiting the number of joining requests in the next upstream transmission from three to one.

According to an example embodiment, the OLT is further configured to repeatedly perform the detecting, selecting, and requesting until the OLT distinctively identifies one or more joining ONUs.

In other words, the OLT repeats the steps of detecting, selecting, and requesting until it is able to distinctively identify one or more joining ONUs. That is, in the case the OLT detects interference burst sequences from multiple joining ONUs, the OLT is able to distinguish the interference burst sequences from one another and the detected interference burst sequences are such that the OLT is able to allocate timeslots in the upstream frames for the respective joining ONUs and associate uniquely the timing information with the detected interference burst sequences. This could be the case when the OLT detects two different interference burst sequences associated with the same or different subsets. Alternatively, this may be the case when the OLT detects twice the same interference burst sequences associated with the different subsets.

According to an example embodiment, the OLT is further configured to perform: requesting transmission of the interference burst sequence from the joining ONUs for a number of upstream frames.

In other words, the transmission of the interference burst sequences is triggered by a request from the OLT. Further, the OLT may request transmission of interference burst sequences from the joining ONUs at a selected time interval. For example, every second or fourth upstream frame. This allows the OLT to control the transmission of the interference burst transmissions and therefore the ranging process.

According to an example embodiment, the OLT is further configured to perform adjusting transmission power level of the transmitting ONUs and/or one or more joining ONUs.

Adjusting the transmission power level of the transmitting ONUs and/or the joining ONUs allows the OLT to substantially equalize the received power at the OLT for all ONUs, i.e. transmitting and joining ONUs. This ensures that the OLT is able to detect the interference burst sequences transmitted by a joining ONU located at a much further distance from the OLT even if the transmitting ONUs are located much closer, e.g. at a minimum distance from the OLT. For example, if the OLT is not able to detect interference burst sequences transmitted from any joining ONUs, the OLT may repeatedly broadcast in the optical network a request to the joining ONUs to gradually increase their transmission power level. This request may be broadcasted until the OLT is able to detect an interference burst sequence from a joining ONU.

According to a second example aspect an optical network unit, ONU, is disclosed configured to communicate in a point-to-multipoint optical network with an optical line terminal, OLT, where upstream traffic from one or more transmitting ONUs to the OLT is organized in frames comprising codewords, the ONU being configured to perform:
  transmitting an interference burst sequence to the OLT at a selected time of transmission relative to a reference time point, the interference burst sequence comprising a pre-determined sequence of pulses for inducing errors distributed over the codewords, and, allowing the OLT to identify the ONU as a joining ONU;
  receiving, from the OLT, timing information; and
  determining a time of a subsequent transmission, based upon the selected time of transmission and the received timing information, thereby enabling the subsequent transmission from the ONU to be received by the OLT within an allocated upstream transmission timeslot.

In other words, the ONU transmits an interference burst sequence at a selected time of transmission relative to a reference time point. The reference time point may, for example, be the start time of the downstream frame or any other suitable for the purpose reference time point. The ONU may thus select a time of transmission relative to the start time of the downstream frame. For example, the ONU may select the transmission time by adding a time offset to the start time of the downstream frame. The selection of the time offset and, therefore, the selection of the transmission time may be done randomly.

Further, the transmitted interference burst sequence comprises a pre-determined pulse sequence that when coinciding with the upstream transmission from the transmitting ONUs induces errors distributed over the codewords of the upstream frame. As the errors are caused by the transmission of a pre-determined sequence of pulses, the OLT is able to distinguish these errors from other random errors and to identify these errors as a joining request from the ONU. Further, as the errors are distributed over the codewords, the OLT is able to detect and correct the errors thereby ensuring error-free upstream traffic reception. Furthermore, as the time of transmission is selected by the ONU itself, the errors from the interference burst transmission from different joining ONUs are induced in the upstream frame at different time points. This allows the OLT to easier distinguish the different interference burst sequences from one another.

The ONU then receives timing information from the OLT which comprises information enabling the ONU to determine a time of subsequent transmission. More specifically, the ONU uses the received timing information to adjust the selected time of transmission. Doing so, allows the subsequent transmission from the ONU to be received by the OLT within an allocated upstream transmission timeslot. Thus, a ranging process is performed without configuring any quiet windows. Otherwise said, the OLT does not halt the upstream transmission for all transmitting ONUs for the ranging process contrary to the conventional solutions. As a result, significant latency in the upstream traffic is avoided thereby enabling low latency data transmission.

According to an example embodiment, the ONU is further configured to receiving, from the OLT, a request for a new transmission of an interference burst sequence, and, choosing, thereupon, a new time of transmission relative to the reference time point.

In other words, upon reception of a new transmission request from the OLT, the ONU selects a new time of transmission relative to the reference time point. The selection may be done randomly. This allows randomizing the transmission time of the interference burst sequences from the different joining ONUs. This increases the chance the OLT receives the respective interference burst sequences at different times. This allows the OLT to distinguish the interference burst sequences from one another and therefore improves the efficiency of the elimination procedure.

According to an example embodiment, the ONU is further configured to perform selecting an interference burst sequence from a set of interference burst sequences as the interference burst sequence.

In addition to selecting a new transmission time, the ONUs may further select a new interference burst sequence from the set of burst sequences. Again, the selection may be done randomly. This increases the chances that the OLT receives the different interference burst sequences, and, therefore improving the efficiency of the elimination procedure.

According to an example embodiment, the set of interference burst sequences comprises subsets of interference burst sequences, and wherein the selecting further comprises selecting an interference burst sequence associated with one of the subsets as the interference burst sequence.

In other words, the interference burst sequences are associated with subsets of burst sequences. The respective interference burst sequences may be associated with one or more subsets. The association with the subsets may be pre-determined. That is, the ONU and the OLT know how the respective interference burst sequences are associated with the subsets. Associating the interference burst sequences with subsets, allows the OLT to limit efficiently the number of joining requests to a number of joining requests which may be distinctively identified by the OLT. More specifically, the OLT identifies the subsets to which the transmitted interference burst sequences are associated, and to use that information to limit the number of the joining ONUs to the extend it is able to distinctively identify the errors in the upstream frame from the respective interference burst sequences.

According to an example embodiment, the transmitting is further performed at a pre-determined upstream transmission interval.

The ONUs transmit the interference burst sequences at a pre-determined time interval. This time interval may be selected by the ONU. Alternatively, the predetermined time interval may be selected by the OLT instead. In that case, the OLT informs the ONU of the selected time interval. This may, for example, be performed together with the request for sending the interference burst sequence.

The other example embodiments of the first example aspect may be applied as example embodiments to the second aspect.

According to a third example aspect, a method is disclosed comprising:
  by an OLT configured to communicate in a point-to-multipoint optical network with ONUs where upstream traffic from one or more transmitting ONUs to the OLT is organized in frames comprising codewords,
  detecting, in the upstream traffic, an interference burst sequence transmitted by an ONU, the interference burst sequence comprising a pre-determined sequence of pulses for inducing errors distributed over the codewords, and, allowing the OLT to identify the ONU as a joining ONU;
  allocating an upstream transmission timeslot in the frames for the ONU;
  determining timing information for enabling a subsequent transmission from the ONU to be received within the allocated upstream transmission timeslot based on a time of reception of the interference burst sequence and the allocated upstream transmission timeslot; and
  transmitting the timing information to the ONU.

According to a fourth example aspect, a method is disclosed comprising:
  by an ONU configured to communicate in a point-to-multipoint optical network with an OLT where upstream traffic from one or more transmitting ONUs to the OLT is organized in upstream frames comprising codewords,
  transmitting, an interference burst sequence to the OLT at a selected time of transmission relative to a reference time point, the interference burst sequence comprising a pre-determined sequence of pulses for inducing errors distributed over the codewords, and, allowing the OLT to identify the ONU as a joining ONU;
  receiving, from the OLT, timing information; and
  determining a time of a subsequent transmission, based upon the selected time of transmission and the received timing information, thereby enabling the subsequent transmission from the ONU to be received by the OLT within an allocated upstream transmission timeslot.

The various example embodiments of the first and second example aspects may be applied as example embodiments to the third and fourth example aspects, respectively.

BRIEF DESCRIPTION OF THE DRAWINGS

Some example embodiments will now be described with reference to the accompanying drawings.

DETAILED DESCRIPTION OF EMBODIMENT(S)

Figure 1:
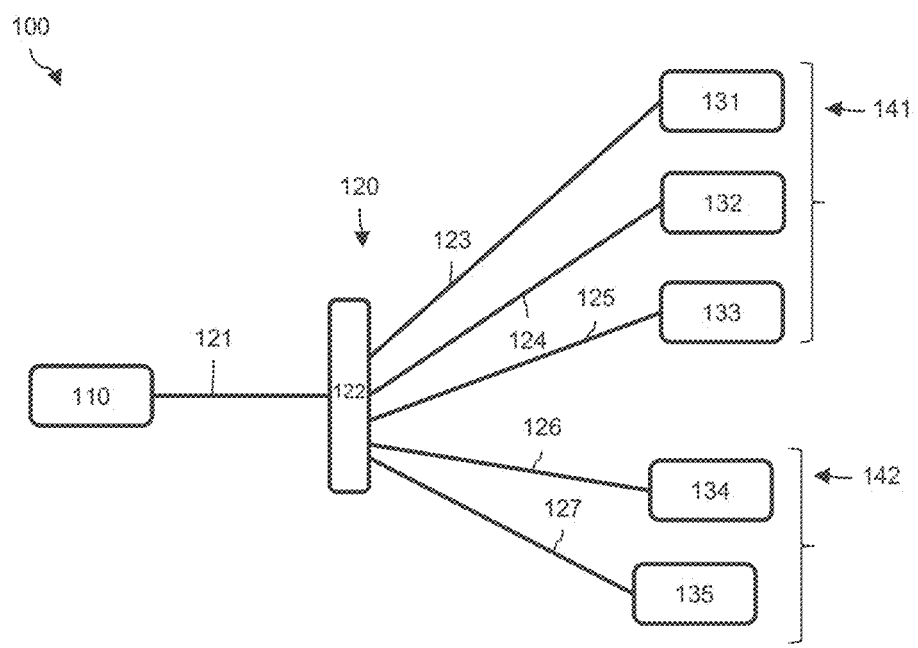
FIG. 1 shows a schematic block diagram of a point-to-multipoint optical network according to an example embodiment of the present disclosure.

FIG. 1 shows a schematic block diagram of a point-to-multipoint optical network 100 according to an embodiment of the present disclosure. The optical network may be passive or active. The optical network 100 comprises an OLT 110 and a plurality of endpoints or ONUs, 131-135, via an optical distribution network, ODN 120. In this example, the OLT 110 is coupled to five endpoints, however, the OLT may be coupled to fewer or more endpoints. The ODN has a tree structure and thereto comprises an optical feeder fibre 121, a passive optical splitter/multiplexor 122, and N optical distribution fibres or drop fibres 123-127 that connect the splitter/multiplexor 122 to the respective ONUs 131-135. In the downstream, the passive optical splitter/multiplexor 122 splits the optical signal coming from the OLT 110 into N lower power optical signals to the N ONUs 131-135, while in the upstream direction, the passive optical splitter/multiplexor 122 multiplexes the N optical signals coming from the N ONUs (131-135) into one optical signal.

The ODN 120 may be a Gigabit passive optical network, G PON, according to the ITU-T G.984 standard, a 10× Gigabit passive optical network, 10G-PON, according to the ITU-T G.987 standard, a 10G symmetrical XGS-PON according to the ITU-T G.9807 standard and a four-channel 10G symmetrical NG-PON2 according to the ITU-T G.989 standard, or a next generation passive optical network, NG-PON.

The optical network 100 may be a time-division multiplexed, TDM, or time wavelength division multiplexed, TWDM, optical network. In a TDM optical network, the downstream communication from the OLT to the ONUs is performed by broadcasting data for different ONUs in separate timeslots, while in the upstream direction, each ONU is assigned a time slot to transmit its data towards the OLT resulting in a burst communication. In a TWDM optical network, for example, the downstream and the upstream communications are performed in the same manner as in the TDM optical network with the difference that now multiple wavelengths are used for both the downstream and upstream communication.

In such optical networks, before an ONU becomes operational, i.e. may exchange traffic with the OLT, the ONU undergoes a so-called ranging process during which the OLT measures the roundtrip delay, RTD, to the ONU and assigns a serial number of the ONU. Such an ONU is commonly referred to as a joining ONU. After a successful ranging process, the OLT assigns a time slot to the joining ONU within the upstream frame within which the joining ONU may transmit its upstream data traffic to the OLT. With the completion of the ranging process, the ONU becomes operational and may transmit its upstream data traffic during the timeslot within the upstream frame allocated for it.

In the embodiment of FIG. 1, group 141 of ONUs 131 to 133 are already in operation and are in communication with the OLT 110. Accordingly, the OLT 110 assigns to each of the ONUs that are in operation a timeslot within the upstream frame, while the group 142 of the ONUs 134 and 135 are not yet operational. Operational ONUs will be herein referred to as transmitting ONUs, while non-operational ONUs will be referred to as joining ONUs.

Upstream data traffic from the operational ONUs 131-133 to the OLT 110 is thus scheduled according to time-division multiple access, TDMA. According to the TDMA, the OLT performs TDMA bandwidth allocation to grant transmission to the operational ONUs. The grants may be allocated dynamically in accordance with a dynamic upstream allocation map, which allocates dynamically upstream bandwidth to the operational ONUs based on their traffic requirements. The upstream bandwidth allocation grants the operation ONUs to send their upstream data traffic at a specific timeslot, i.e. at a specific point in time and for a specific duration, thereby avoiding any collisions between the burst from the operation ONUs. The transmitting ONUs, thus, respectively transmit their data traffic in the form of optical encoded data units or codewords to the OLT within timeslots allocated to them.

Figure 2:
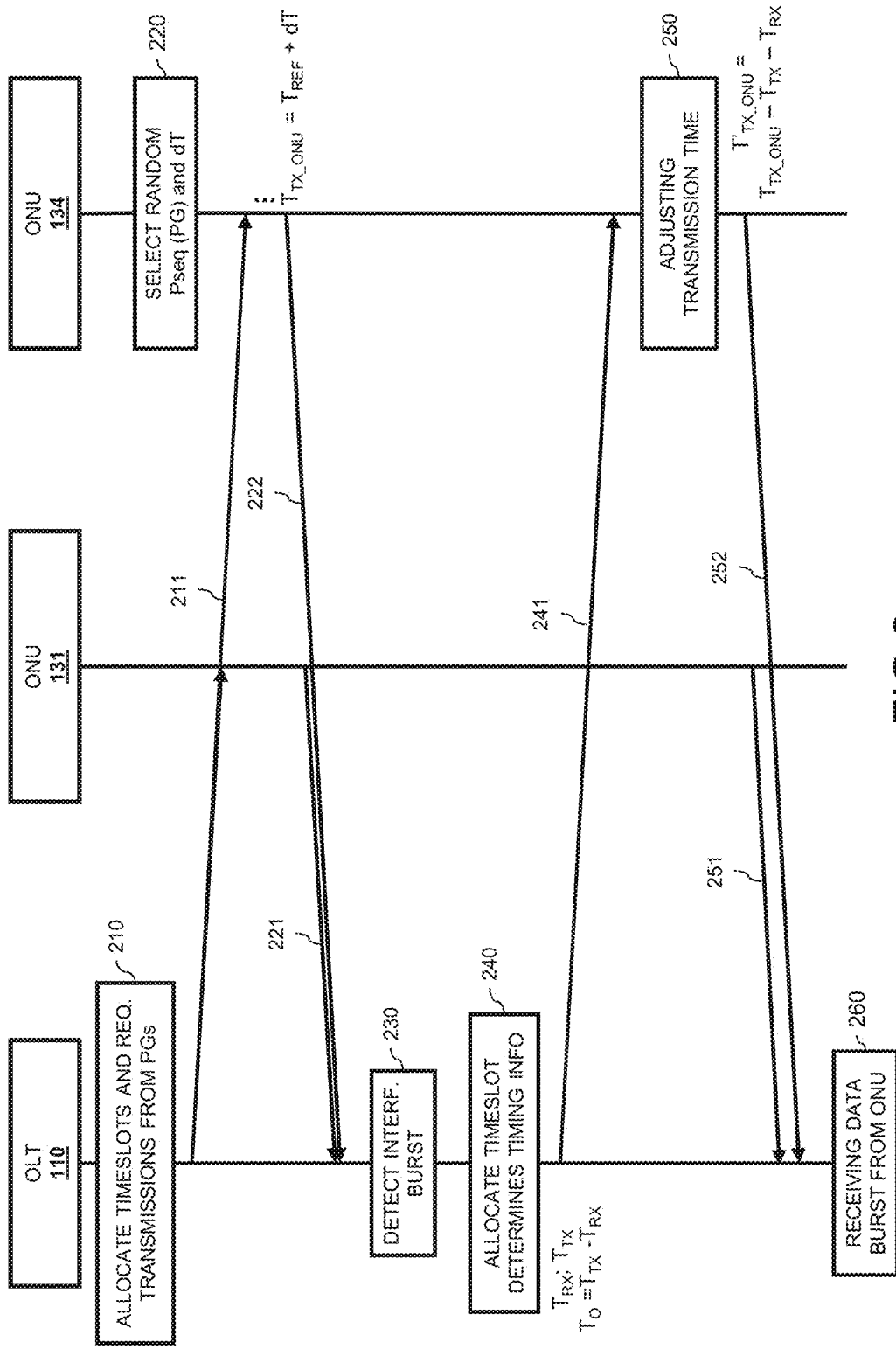
FIG. 2 shows a schematic flow diagram of a method according to an example embodiment of the present disclosure.

FIG. 2 shows a schematic flow diagram of a method according to the embodiment of FIG. 1 and wherein one ONU, i.e. ONU 134, is a joining ONU.

In step 210, the OLT assigns to each transmitting ONUs a timeslot within the upstream frame to transmit their upstream burst signal to the OLT 110. In this example, there are three transmitting ONUs 131-133, however, for simplicity, only one of them, i.e. ONU 131, is illustrated.

At the same time, the OLT 110 sends a request 211 for transmission from ONUs communicatively connected to the OLT but not yet operational or transmitting, i.e. joining ONUs. The request 211 may be sent in the form of a PLOAM message which may be added in the downstream frame. Thus, the OLT broadcasts the request to the ONUs in the optical network. This request may be transmitted repeatedly at a predetermined time interval, for example, in the preamble of every second downstream frame. This allows the OLT to poll the joining ONUs. In this example, only ONU 134 is considered as a joining ONU.

In step 220, the joining ONUs select a predetermined sequence of pulses. The predetermined sequence of pulses, Pseq, may be selected randomly from a set of predetermined pulse sequences, PG. Additionally, the joining ONUs selects a time offset, dT, from a reference time point, $T_{REF}$. The time offset dT may also be selected randomly. In TDM or TWDM optical networks, the downstream frame is synchronized with the upstream frame. For example, the downstream frame and the upstream frame are of the same duration or the duration of the downstream frame is an integer multiple of the duration of the upstream frame. The start of the downstream frame may thus be used by the joining ONUs as a reference time point. Each of the joining ONUs, thus, selects a time of transmission, $T_{TX\_ONU} = T_{REF} + dT$, which is relative to the reference time point and, therefore, relative to the downstream frame and to the upstream frame. In other words, the reference time point is a clock recorded by the joining ONU that is related to the duration of the upstream frame. The reference time point may be periodically repeated by the joining ONUs. For example, the reference time point may be the time when a new upstream frame begins in view of the joining ONU. In this example, this step 220 is performed by the one joining ONU, i.e. ONU 134.

The step 220 may be performed before step 210 or simultaneously with step 210. Thus, upon receiving request 211 from the OLT, the joining ONU 134 transmits the selected predetermined sequence of pulses 222 at the selected time of transmission, $T_{TX\_ONU}$. The predetermined sequence of pulses is thus transmitted to the OLT during the upstream frame. As a result, the transmission of the joining ONU 134 overlaps with the upstream transmission from one or more of the transmitting ONUs 131 and 133. The predetermined sequence of pulses transmitted by the joining ONU comprises pulses that induce errors distributed over the codewords in the upstream transmission from one or more of the transmitting ONUs. The OLT is thus able to, on one hand, detect the errors in the upstream frame, and, on the other hand, to correct the errors by applying an error correction code, such as a linear error correction code. An example of a linear error correction code is the low-density parity-check, LDPC, code. Preferably, to correct for these errors, the interference pulses should be introducing a limited number of bit errors in a given codeword, i.e. the induced bit errors in a given codeword should be correctable by the error correction code. For example, the interference pulse may have a duration of 10 bits which corresponds to a duration of 1 nsec on a 10 Gbps optical network. In that case, such an interference pulse will induce on average five bit errors in the coinciding codeword. Such errors may be easily corrected by applying for example an error correction code such as the LDPC code.

The transmission 222 of the joining ONU 134 overlaps with the upstream transmission 221 from the transmitting ONU 131 which induces errors in the codewords of the transmission ONU 131.

In step 230, after the OLT 110 receives the upstream transmission comprising the burst signals transmitted by the transmitting ONUs 131 to 133 and the interference burst signal from the joining ONU 134, the OLT corrects the errors in the upstream transmission by applying the error correction code. The OLT then analyses whether the corrected errors are resulting from an interference burst signal transmitted by a joining ONU, thereby detecting whether the induced errors are caused by interference burst sequences transmitted by one or more joining ONUs. For this purpose, the OLT estimates what is the probability of the errors in the upstream transmission to correspond to errors caused by an interference burst sequence 222 transmitted from a joining ONU. For example, the OLT compares the bitstream of the upstream transmission as received with the corrected bitstream of the upstream transmission. Differences between these bitstreams indicate the errors in the received bitstream that were successfully corrected as well as their location in the upstream transmission. The OLT, then correlates the pattern of the detected errors with one or more predetermined sequence of pulses to estimate the probability of the detected errors to correspond to errors caused by the predetermined sequence of pulses. As a result, the OLT detects if there are errors caused by an interference burst sequence.

In step 240, upon identifying that the errors are caused by an interference burst sequence from a joining ONU, the OLT 110 determines the time of reception, TRX, of the interference burst with respect to its time reference. The time of reception of the interference burst sequence is derived from the location of the errors in the received bitstream. Additionally, the OLT allocates a timeslot in the subsequent upstream frame, i.e. a start time and a duration of the timeslot, during which the joining ONU 134 may send its PLOAM message to the OLT to complete the ranging procedure. The start time of the allocated timeslot, $T_{TX}$, is set at a time location with respect to the OLT's time reference. The OLT further determines a time offset $T_O = T_{TX} - T_{RX}$. The OLT sends this time offset, $T_O$, to the joining ONU 134 in the subsequent downstream frame 241. Alternatively, instead of sending the time offset, the OLT may send the start time of the allocated timeslot, $T_{TX}$, together with the time of reception, $T_{RX}$, to the joining ONU. This timing information, i.e. $T_O$, or, $T_{TX}$ and $T_{RX}$, allows the joining ONU 134 to determine a new time of transmission which enables the joining ONU to send its ONU's identifier to the OLT within the allocated upstream timeslot in the subsequent upstream frame. The timeslot allocated to the joining ONU should be long enough to fit the information containing the joining ONU's identifier. The timeslot can be very short in the range of a few μsec. Typically, the duration of a burst signal comprising the ONU's identifier is less than 0.3 μsec. Thus, the time slot allocated for its transmission should be as long as the duration of the burst signal, i.e. 0.3 μsec, and including some time accounting for the variation in the ONU's response time, e.g. 2 μsec, as well as some time accounting for uncertainty in the determined time of reception of the interference burst sequence $T_{RX}$, e.g. 1 μsec. The total duration of the allocated time slot, e.g. 3.3 μsec, is thus negligible in comparison to the duration of a quiet window which has a duration of at least 200 μsec and up to 500 μsec.

In step 250, after receiving the timing information from the OLT, the ONU adjusts its time of transmission, $T_{TX\_ONU}$, with the received timing information. If the timing information comprises the time offset, $T_O$, the joining ONU adds the obtained time offset to its selected time of transmission, i.e. $T'_{TX\_ONU} = T_{TX\_ONU} + T_O$. If the timing information comprises the start time of the allocated timeslot, $T_{TX}$, and the time of reception, $T_{RX}$, then the joining ONU adds $T_{TX}$ and subtracts $T_{RX}$ from the selected time of transmission, i.e. $T'_{TX\_ONU} = T_{TX\_ONU} + T_{TX} - T_{RX}$. Note, that this equation presumes that the $T_{RX}$ of the OLT and the $T_{TX\_ONU}$ of the ONU are defined in the same way, or in other words, both of these times refer to, for example, the first pulse of the interference burst. The new time of transmission is then used by the joining ONU to send its PLOAM message 252 containing the joining ONU's identifier during the subsequent upstream transmission. Clearly that the duration of the PLOAM message 252 shall fit in the allocated timeslot. The upstream transmission 252 from the joining ONU 134 will thus not overlap with the upstream transmission 251 from the other transmitting ONUs 131 to 133. The PLOAM message 252 can be successfully received by the OLT within the timeslot allocated to the joining ONU 134.

In the last step, i.e. in step 260, the OLT 110 receives the PLOAM message contained in the upstream transmission 252 of the joining ONU 134. This marks the completion of the ranging process with which the joining ONU 134 becomes an operational ONU. The ranging process is completed without configuring any quiet window.

Figure 3:
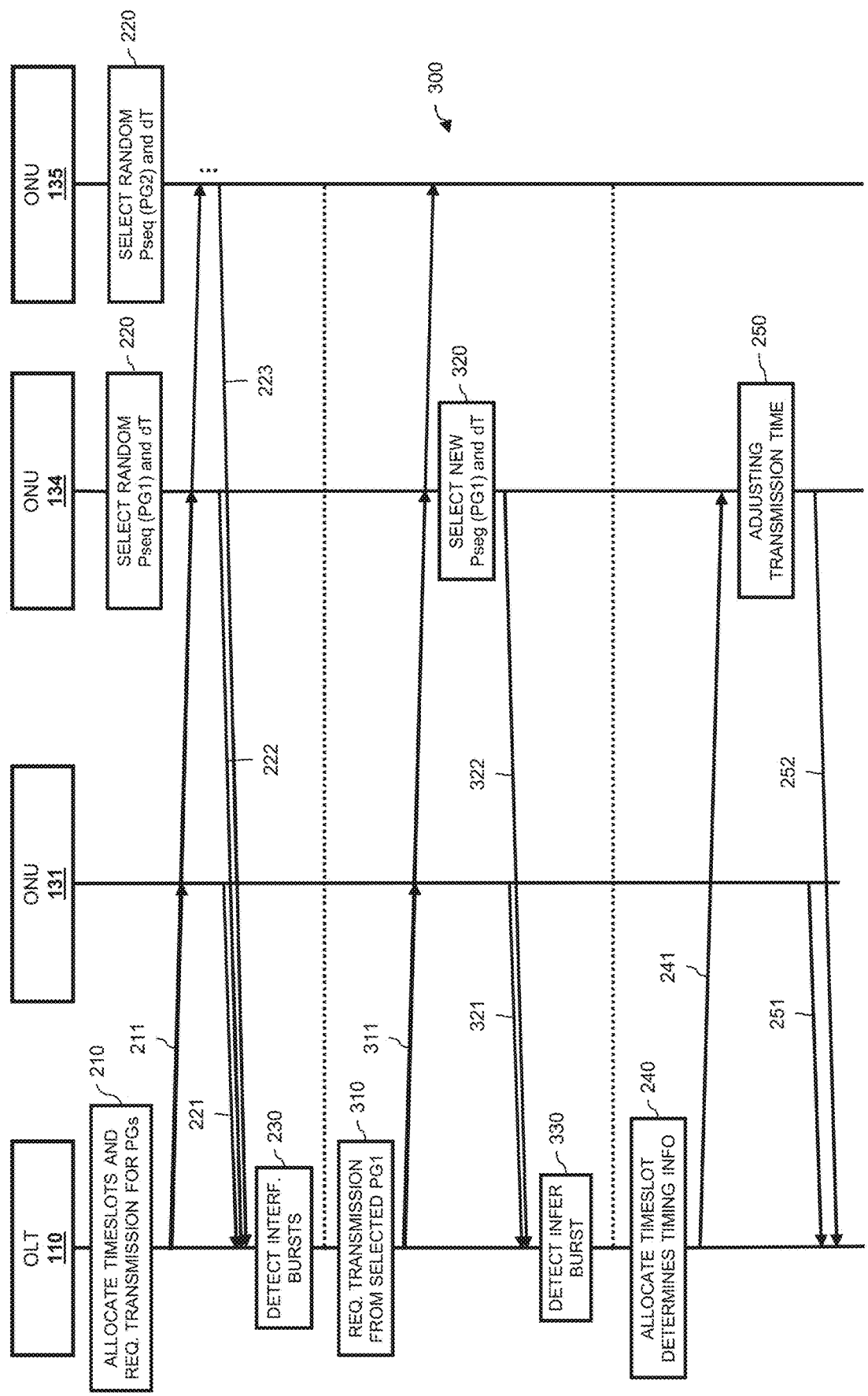
FIG. 3 shows a schematic flow diagram of a method according to another example embodiment of the present disclosure.

FIG. 3 shows a schematic flow diagram of a method according to the embodiment of FIG. 1 and wherein multiple ONUs, i.e. ONU 134 and 135, are joining ONUs.

Those steps of the method which are identical to those shown in FIG. 2 are denoted by identical reference signs. In this example, there are three already transmitting ONUs 131-133 and two joining ONUs 134 and 135. For simplicity, only one of the transmitting ONUs, i.e. ONU 131, is illustrated.

Differently from the embodiment of FIG. 2, herein, step 220 is performed by the two joining ONUs, i.e. ONUs 134 and 135. That is, each of the joining ONUs selects a pre-determined sequence of pulses, Pseg, and a time offset, dT, as detailed above with reference to FIG. 2. Herein, the predetermined sequence of pulses within the set of a pre-determined sequence of pulses, PG, are associated with pre-determined n subsets of a predetermined sequence of pulses, e.g. PG1 to PGn. A pre-determined sequence of pulses Pseq may be associated with one or more of these subsets. In this example, the pre-determined pulse sequences are associated with two subsets, i.e. PG1 and PG2. As a result, joining ONU 134 may select a pulse sequence associated with one subset, i.e. Pseq associated with subset PG1, while the joining ONU 135 may select a pulse sequence associated with another subset, i.e. Pseq associated with subset PG2. In this embodiment, both the OLT and the ONUs in the optical network know to which subset or subsets the pre-determined sequence of pulses are associated with.

In step 230, the OLT 110 will detect errors in the upstream transmission 221 from the transmitting ONUs 131 to 133 caused by the interference burst signals 222 and 223 from the two joining ONUs 134 and 135. In the case, the OLT is able to distinctively identify the interference burst signals from each other, the method will proceed further from step 240 and onwards and as detailed above with reference to FIG. 2. Namely, the OLT allocates respective timeslots in the upstream frame for the joining ONUs and determines respective timing information for the joining ONUs, e.g. $\{T_{O1}=T_{TX1}-T_{Rx1}\}$ and $\{T_{O2}=T_{TX2}-T_{RX2}\}$. The OLT then sends the respective timing information to the joining ONUs 134 and 135. In step 250, the joining ONUs respectively adjust their time of transmission with the received timing information and send their respective identifiers in a PLOAM message to the OLT at the adjusted time of transmission, i.e. $T'_{TX\_ONU1}$ and $T'_{TX\_ONU2}$. Once, the OLT receives the PLOAM messages from the joining ONUs 134 and 135, the ranging process for the two joining ONUs is completed without configuring any quiet window.

In the case the OLT is not able to distinctively identify the interference burst signals from each other, the OLT will initiate an elimination procedure 300. This may be the case, when the joining ONUs have selected the same pulse sequence or when the OLT is not being able to distinguish the interference bursts from one another. The method thus proceeds to step 310.

In step 310, the OLT selects one of the subsets, e.g. subset PG1, and sends a new request 311 for a new transmission from the joining ONUs. This time, the request contains an identification of the subset selected by the OLT, e.g. the first subset, i.e. PG1. Similar to step 210, the request may be sent in the form of a PLOAM message which may be added in the downstream frame.

In step 320, the joining ONUs receive the new request 311 containing the selected subset PG1. The joining ONUs 134 and 135 then check whether they have transmitted a pulse sequence associated with the selected subset PG1. If so, these joining ONUs, i.e. ONU 134, transmit again the selected pulse sequence at the selected time of transmission, i.e. $T_{TX\_ONU}=T_{REF}+dT$. Alternatively, the joining ONU 134 may select a new pulse sequence and/or a new time offset dT in the same way as in step 220. Again, the transmission 322 of the joining ONU 134 overlaps with the upstream transmission 321 of the transmitting ONUs 131 to 133.

Similarly to step 230, in step 330, the OLT detects the errors in the upstream transmission 321 induced by the interference burst signal 322 transmitted from the joining ONU 134, thereby identifying a single joining request, i.e. the joining request from ONU 134. This completes the elimination procedure 300. The method thus proceeds as described above to step 240 and onwards as detailed above with reference to FIG. 2.

Steps 310 to 330 of the elimination procedure are repeated until the OLT is able to distinctively identify the interference burst signals from joining ONUs. In other words, until the OLT identifies only one joining request or until the OLT is able to identify joining requests from two or more joining ONUs which the OLT is able to distinguish from one another and able to associate uniquely timing information with the detected interference burst sequences. For example, if the OLT identifies joining request from two or more ONUs which have however transmitted the same pulse sequence associated with the same subset, the OLT will continue the elimination procedure until only it identifies one joining request. On the other hand, if the OLT distinctively identified joining request from two or more joining ONUs which have however transmitted different pulse sequences whether associated with the same or different subsets, then the OLT will terminate the elimination procedure.

Figure 4:
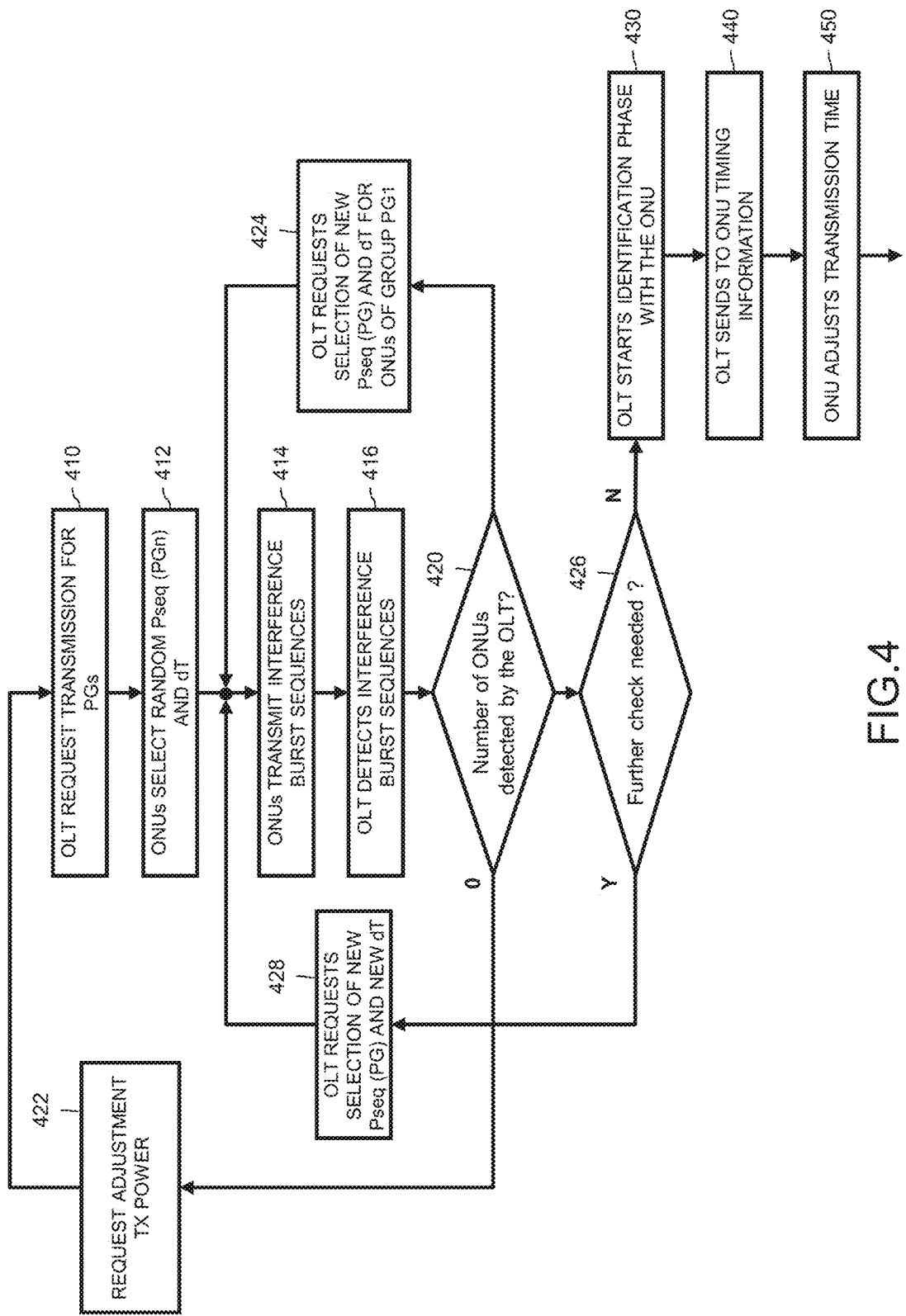
FIG. 4 shows a schematic flow diagram of a method according to yet another example embodiment of the present disclosure.

FIG. 4 shows a schematic flow diagram of a method for activating joining ONUs according to the embodiment of FIG. 1 where multiple ONUs are joining ONUs. The method of FIG. 4 is thus similar to the method described with reference to FIG. 3. For reasons of simplicity, however, the method of FIG. 4 is described with a focus on the steps performed by the joining ONUs. The steps performed by the transmitting ONUs are, thus, not discussed.

Herein, the method starts with step 410 which corresponds to step 210 as described with reference to FIG. 3. The OLT thus sends a request for a transmission of interference bursts from the joining ONUs as in step 210 of FIG. 3.

In step 412, each of the joining ONUs select a pre-determined sequence of pulses, Pseg, from any of the subsets PG1 to PGn and a time offset, dT. In step 414, the joining ONUs transmit the selected pulse sequences at the selected time of transmission. Steps 412 and 414 thus correspond to step 220 and step 223 of FIG. 3, respectively.

In step 416, the OLT detects the interference burst sequences transmitted from the joining ONUs. Step 416 thus corresponds to step 230 of FIG. 3. In step 420, the OLT checks how many joining ONUs it was able to distinctively identify based on the detected interference burst sequences.

If the OLT has identified no joining ONUs, the method proceeds to step 422 where the OLT sends a request for transmission power adjustment to the joining ONUs and/or the transmitting ONUs. During this step, the OLT enforces levelling of the ONUs transmit power so that the received power at the OLT of all ONUs transmissions is substantially equal. Transmit power levelling is necessary, for example, when the transmitting ONUs are located in the optical network at a minimal or a much shorter distance from the OLT than the joining ONUs and vice versa.

In the first situation, if the transmit power of the joining ONUs is low, the interference burst sequences transmitted from the joining ONUs might not be sufficient to generate bit errors in the much stronger optical signal of the transmitting ONUs. The transmit power levelling would avoid this issue, since it would force the ONUs to adjust their transmit power to a level that could also be obtained by the ONU most distantly located in the optical network. In this step, the OLT may repeatedly broadcast a request to the joining ONUs to gradually increase their transmit power until the OLT is able to detect an interference burst sequence from at least one of the joining ONUs. Alternatively, the OLT may repeatedly broadcast a request to the transmitting ONUs to gradually decrease their transmit power until the OLT is able to detect an interference burst sequence from at least one of the joining ONUs. Further, a combination of the above options may also be performed.

In the second situation, the OLT may repeatedly broadcast a request to the joining ONUs to gradually lower their transmission power until the OLT is able to receive the upstream transmission from the transmitting ONUs. Other possible ways to adjust the transmit power of the joining ONUs and transmitting ONUs are also possible.

After adjustment of the transmit power levels, the method continues again from step 410.

If the OLT has indistinctively identified several joining ONUs, the method proceeds to step 424 which corresponds to steps 310 and 320 of FIG. 3. In this step, the OLT, first, selects one of the n subsets, i.e. PG1, . . . , PGn, to which the detected interference burst sequences are associated with and, then request a new interference burst transmission from the joining ONUs which have transmitted a pulse sequence associated with the selected by the OLT subset. Doing so, the OLT requests new transmission of interference burst sequences from a subset of the joining ONUs. The request is broadcasted to the joining ONUs as described above with reference to FIG. 3. Upon receiving the request, the joining ONUs which have transmitted in the preceding upstream transmission a pulse sequence associated with the subset selected by the OLT, select a new pulse sequence and/or a new time offset dT. The ONUs may, thus, randomly select a new pulse sequence Pseq from any of the subsets PG1 to PGn and/or new time offset dT. As a result, steps 414, 416, 420 and 424 are repeated until the OLT is able to distinctively detect one or more joining ONUs. Steps 414, 416, 420 and 426 thus outline the steps of the elimination procedure.

If the OLT has distinctively identified one or more joining ONUs, the method proceeds to step 426 where the OLT check if further checks need to be performed. For example, the further check may specify that the OLT is to request a new interference burst sequence transmission from the identified joining ONUs for a number of upstream transmissions. If such further check is required, the method proceeds to step 428 where the OLT request a new interference burst sequence transmission from the identified joining ONUs for the number of upstream transmissions. As a result, steps 414, 416, 420, 426, and 428 are repeated as many times as pre-set in the further check. Once, the further check is completed, the method proceeds to step 430, where the OLT starts the identification phase with the identified joining ONUs. The OLT allocates timeslots and determines timing information for the identified joining ONUs, respectively. In the next step, i.e. step 440, the OLT sends the determined timing information to the respective identified joining ONUs. Steps 430 and 440 thus corresponds to step 240 of FIG. 2 and FIG. 3. In step 450, the identified joining ONUs, adjust their time of transmission based on the timing information in the same way as described in step 250 of FIG. 3.

Figure 5:
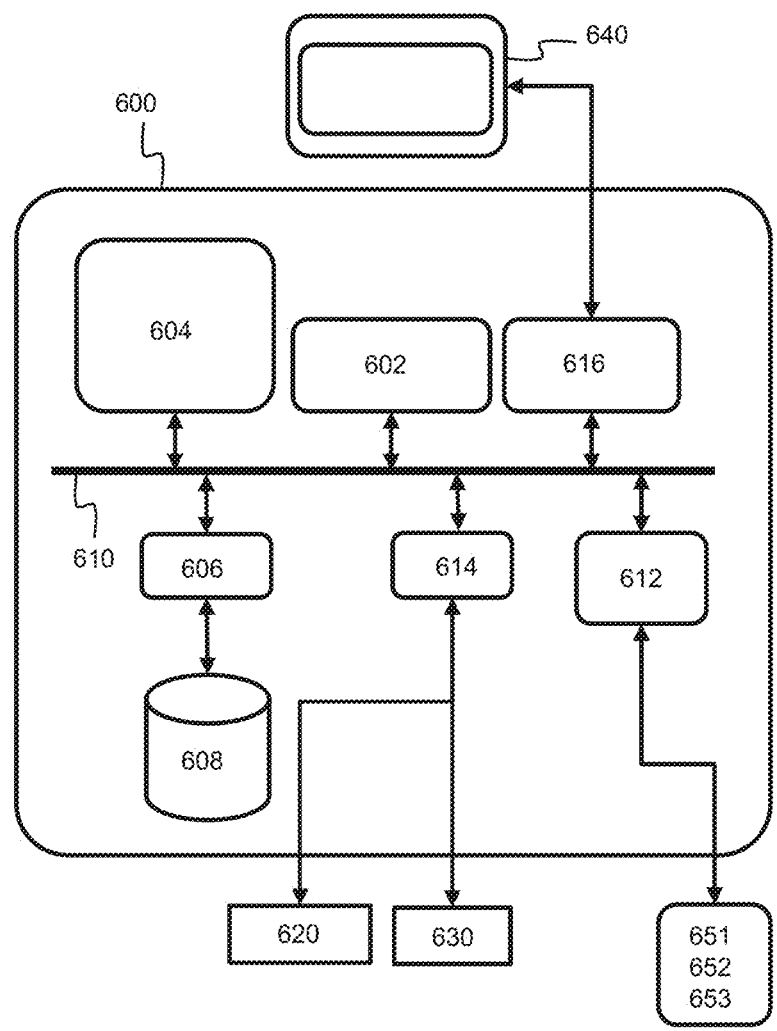
FIG. 5 shows an example embodiment of a suitable computing system for performing one or several steps in embodiments of the invention.

FIG. 5 shows a suitable computing system 600. Computing system 600 may, in general, be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory, RAM, or another type of dynamic storage device that stores information and instructions for execution by processor 602 and/or read-only memory, ROM, or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 600 to communicate with other devices and/or systems, for example with other computing devices 651, 652, 653. The communication interface 612 of computing system 600 may be connected to such another computing system by means of a local area network, LAN, or a wide area network, WAN, such as for example the internet. Storage element interface 606 may comprise a storage interface such as for example a Serial Advanced Technology Attachment, SATA, interface or a Small Computer System Interface, SCSI, for connecting bus 610 to one or more storage elements 608, such as one or more local disks, for example, SATA disk drives, and control the reading and writing of data to and/or from these storage elements 608. Although the storage element(s) 608 above is/are described as a local disk, in general, any other suitable computer-readable media such as a removable magnetic disk, optical storage media such as a CD or DVD, -ROM disk, solid-state drives, flash memory cards, . . . could be used.

The computing system 600 is thus suitable for performing various steps performed by an OLT 110 in an optical network 100 according to various embodiments of the present disclosure. According to the present disclosure, the communication interface 612 allows an OLT according to various embodiments of the present disclosure to exchange control information and data with ONUs in the optical network. More specifically, the communication interface allows the OLT to send requests for transmission of interference burst sequences from joining ONUs. According to the example embodiments, the processor may be running a computer program code which allows the OLT to control elimination procedure and allocate timeslot to the respective ONUs in accordance with the dynamic bandwidth allocation mechanism.

Furthermore, the computing system 600 is also suitable for performing various steps performed by an ONU 131-135 in an optical network 100 according to various embodiments of the present disclosure. According to the present disclosure, the communication interface 612 allowsan ONU according to various embodiments of the present disclosure to receive control information and exchange data with an OLT in the optical network. According to the example embodiments, the processor may be running a computer program code that allows the ONU to control the selection of a pulse sequence and the adjustment of the time of transmission.

As used in this application, the term "circuitry" may refer to one or more or all of the following:
 (a) hardware-only circuit implementations such as implementations in only analog and/or digital circuitry and
 (b) combinations of hardware circuits and software, such as (as applicable):
  (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An optical line terminal, OLT, configured to communicate in a point-to-multipoint optical network with optical network units, ONUs, where upstream traffic from one or more transmitting ONUs to the OLT is organized in frames comprising codewords, the OLT comprising at least one processor and at least one memory including computer program code, the at least one memory and computer program code configured to, with the at least one processor, cause the OLT to perform:

detecting, in the upstream traffic, a sequence of interference bursts transmitted by an ONU, the sequence of interference bursts comprising a sequence of pulses that induce errors distributed over the codewords;

identifying the ONU as a joining ONU based on the sequence of interference bursts;

allocating an upstream transmission timeslot in one or more subsequent frames for the joining ONU;

determining timing information for enabling a subsequent transmission from the joining ONU to be received within the allocated upstream transmission timeslot based on a time of reception of the sequence of interference bursts and the allocated upstream transmission timeslot; and transmitting the timing information to the joining ONU.

2. The optical line terminal, OLT, according to claim 1, wherein the detecting comprises detecting sequences of interference bursts transmitted by ONUs, the sequences of interference bursts comprising a respective sequence of pulses for inducing errors distributed over the codewords, and, allowing the OLT to identifying the ONUs as joining ONUs based on the sequences of interference bursts; and wherein the detecting further comprises identifying a number of sequences the detected sequences of interference bursts.

3. The optical line terminal, OLT, according to claim 2, wherein the sequences of interference bursts are associated with subsets of sequences of interference bursts, and, wherein the OLT is further configured to perform an elimination procedure for distinctively identifying one or more joining ONUs from the joining ONUs based upon the subsets.

4. The optical line terminal, OLT, according to claim 3, wherein the elimination procedure comprises:

selecting a subset from the subsets and requesting a new transmission of sequences of interference bursts to joining ONUs which transmitted sequences of interference bursts associated with the selected subset.

5. The optical line terminal, OLT, according to claim 4, wherein the sequences of interference bursts are associated with respective ones of the subsets, and, wherein the selecting further takes into account the detected sequences of interference bursts.

6. The optical line terminal, OLT, according to claim 3, wherein the OLT is further configured to repeatedly perform the detecting, selecting, and requesting until the OLT distinctively identifies one or more joining ONUs.

7. The optical line terminal, OLT, according to claim 1, wherein the OLT is further configured to perform: requesting transmission of the sequence of interference bursts from joining ONUs for a number of frames.

8. The optical line terminal, OLT, according to claim 1, wherein the OLT is further configured to perform:

adjusting transmission power level of at least one of the transmitting ONUs or the one or more joining ONUs.

9. An optical network unit, ONU, configured to communicate in a point-to-multipoint optical network with an optical line terminal, OLT, where upstream traffic from one or more transmitting ONUs to the OLT is organized in frames comprising codewords, the ONU comprising at least one processor and at least one memory including computer program code, the at least one memory and computer program code configured to, with the at least one processor, cause the ONU to perform:

transmitting a sequence of interference bursts to the OLT at a selected time of transmission relative to a reference time point, the sequence of interference bursts comprising a sequence of pulses that induce errors distributed over the codewords, and allow the OLT to identify the ONU as a joining ONU based on the sequence of interference bursts;

receiving, from the OLT, timing information; and determining a time of a subsequent transmission, based upon the selected time of transmission and the received timing information, such that the subsequent transmission from the ONU to be received by the OLT within an allocated upstream transmission timeslot is enabled.

10. The optical network unit, ONU, according to claim 9, wherein the ONU is further configured to perform: receiving, from the OLT, a request for a new transmission of a sequence of interference bursts, and, choosing, thereupon, a new time of transmission relative to the reference time point.

11. The optical network unit, ONU, according to claim 9, wherein the ONU is further configured to perform: selecting a sequence of interference bursts from a set of sequences of interference bursts as the sequence of interference bursts.

12. The optical network unit, ONU, according to claim 11, wherein the set of sequences of interference bursts comprises subsets of sequences of interference bursts and wherein the selecting further comprises selecting a sequence of interference bursts associated with one of the subsets as the sequence of interference bursts.

13. The optical network unit, ONU, according to claim 9, wherein the transmitting is further performed at a upstream transmission interval.

14. A method, by an OLT configured to communicate in a point-to-multipoint optical network with ONUs where upstream traffic from one or more transmitting ONUs to the OLT is organized in frames comprising codewords, comprising:

detecting, in the upstream traffic, a sequence of interference bursts transmitted by an ONU, the sequence of interference bursts comprising a sequence of pulses that induce errors distributed over the codewords;

identifying the ONU as a joining ONU based on the sequence of interference bursts;

allocating an upstream transmission timeslot in the frames for the joining ONU;

determining timing information for enabling a subsequent transmission from the joining ONU to be received within the allocated upstream transmission timeslot based on a time of reception of the sequence of interference bursts and the allocated upstream transmission timeslot; and transmitting the timing information to the joining ONU.

15. A method, by an ONU configured to communicate in a point-to-multipoint optical network with an OLT where upstream traffic from one or more transmitting ONUs to the OLT is organized in upstream frames comprising codewords, comprising:

transmitting, a sequence of interference bursts to the OLT at a selected time of transmission relative to a reference time point, the sequence of interference bursts comprising a sequence of pulses that induce errors distributed over the codewords, and allow the OLT to identify the ONU as a joining ONU based on the sequence of interference bursts;

receiving, from the OLT, timing information; and determining a time of a subsequent transmission, based upon the selected time of transmission and the received timing information, such that the subsequent transmission from the ONU to be received by the OLT within an allocated upstream transmission timeslot is enabled.

* * * * *

UNITED STATES PATENT AND TRADEMARK OFFICE
CERTIFICATE OF CORRECTION

PATENT NO. : 11,770,188 B2
APPLICATION NO. : 17/540665
DATED : September 26, 2023
INVENTOR(S) : Paul Henri Marie Cautereels et al.

It is certified that error appears in the above-identified patent and that said Letters Patent is hereby corrected as shown below:

In the Claims

Column 16, Claim 2, Line 20, should read as follows:
2. The optical line terminal, OLT, according to claim 1, wherein the detecting comprises detecting sequences of interference bursts transmitted by ONUs, the sequences of interference bursts comprising a respective sequence of pulses for inducing errors distributed over the codewords, and, identifying the ONUs as joining ONUs based on the sequences of interference bursts; and wherein the detecting further comprises identifying a number of sequences the detected sequences of interference bursts.

Signed and Sealed this
Twenty-sixth Day of March, 2024

Katherine Kelly Vidal
*Director of the United States Patent and Trademark Office*